United States Patent [19]

Mignot

[11] 3,906,210

[45] Sept. 16, 1975

[54] DEVICE FOR EXTRACTING THE SQUARE ROOT OF A BINARY NUMBER

[75] Inventor: Lucien E. Mignot, Saint-Mande, France

[73] Assignee: Etablissement Public de Diffusion, Paris, France

[22] Filed: May 7, 1974

[21] Appl. No.: 467,808

[30] Foreign Application Priority Data

June 1, 1973 France .............................. 73.20009

[52] U.S. Cl. .............................................. 235/158

[51] Int. Cl.²............................................ G06F 7/48

[58] Field of Search..................................... 235/158

[56] References Cited

UNITED STATES PATENTS

| | | | |
|---|---|---|---|
| 3,551,662 | 12/1970 | Price | 235/158 |
| 3,576,983 | 5/1971 | Cochran | 235/158 |
| 3,610,904 | 10/1971 | Kumagai | 235/158 |

*Primary Examiner*—David H. Malzahn
*Attorney, Agent, or Firm*—Abraham A. Saffitz

[57] ABSTRACT

A device for extracting the square root of a binary number, comprising an input shift register receiving the successive digits of the said number from which successive groups of two consecutive digits are extracted and momentarily stored in two unitary memories under the control of a time base. The successive groups are applied to an adder and to a selector circuit. The adder also receives signals from an intermediate register displaying the already found digits of the wanted square root. The selector circuit delivers different signals according to the value of the last found digits of the root. The output of the adder accordingly controls the intermediate register which in turn controls an answer register displaying the digits of the root.

2 Claims, 3 Drawing Figures

DEVICE FOR EXTRACTING THE SQUARE ROOT OF A BINARY NUMBER

This invention relates to an apparatus for extracting the square root of a binary number.

The mode of operation of the apparatus of the invention will be better understood by describing a typical example of the successive partial operations accomplished by said apparatus, starting from the digits of the binary number the root of which is to be extracted and finally displaying the wanted square root.

The computing apparatus of the invention enables the square root of a given binary number N containing for example $(2n+2)$ binary digits or significant "bits" to be quickly calculated; let us write:

$$N = a_{2n+1} \cdot 2^{2n+1} + a_{2n} \cdot 2^{2n} \ldots + a_1 \cdot 2^1 + a_o \cdot 2^0$$

the known quantities being the binary digits $a_o, a_1, \ldots a_{2n+1}$.

The root R sought contains at the maximum $(n+1)$ significant figures and can be written as follows:

$$R = r_n \cdot 2^n + r_{n-1} \cdot 2^{n-1} + \ldots + R^1 \cdot 2^1 + r_o \cdot 2^0$$

The digits of the square root are calculated in $(n+1)$ successive cycles, one digit per cycle, in the order $r_n$, $r_{n-1}, \ldots r_o$.

The known mathematical results on which the operation of the apparatus is based are recapitulated in the following. The binary digit of rank $i$ (reckoned from the left) of the root R, say $r_{n-1}$, is determined as being the carry forward of the addition of two binary numbers. It depends on the results obtained for the preceding digit $r_{n-i+1}$.

If $r_{n-i+1} = 1$, the digit $r_{n-i}$ is the carry-forward of the addition of two binary numbers $A_{n-i}$ and $B_{n-i}$, whereas if $r_{n-i+1} = 0$, the digit $r_{n-i}$ is the carry-forward of the addition of two binary numbers $A_{n-i}'$ and $B_{n-i}$.

When $i = 0$ $A_n = A_N' = a_{2n+1}\ a_{2n}$ $B_n = 1\ 1$

This addition may be written in binary notation:

$$\begin{array}{rccc} & & a_{2n+1} & a_{2n} \\ + & & 1 & 1 \\ \hline = & r_n & (\sigma_1)_n & (\sigma_o)_n \end{array}$$

When $i = 1$, if $r_n = 1$ then $A_{n-1} = (\sigma_1)_n\ (\sigma_o)_n\ a_{2n-1}\ a_{2n-2}$ and if $r_n = 0$.

$A_{n-1}' = a_{2n+1}\ a_{2n}\ a_{2n-1}\ a_{2n-2}$ and, in both cases:

$B_{n-1} = 1\ \overline{r_n}\ 1\ 1$ $\overline{r_n}$ being the complement of $r_n$.

There are therefore two cases for the determination of $r_{n-i}$:

1. — First case: $r_{n-i+1} = 1$

Then, designating by $\Sigma_{n-i+1}$ the binary expression:

$$\Sigma_{n-i+1} = (\sigma_{2i-1})_{n-i+1}\ (\sigma_{2i-2})_{n-i+1} \ldots (\sigma_o)_{n-i+1}$$

one may write:

$$A_{n-i} = \Sigma_{n-i+1} \cdot a_{2(n-i)+1}\ a_{2(n-i)}$$

2. — Second case: $r_{n-i+1} = 0$ then, if $r_{n-i+2} = 1$:

$$A_{n-i}' = A_{n-i+1}\ a_{2(n-i)+1}\ a_{2(n-i)}$$

or, if $r_{n-i+2} = 0$ $$A_{n-i}' = A_{n-i+1}'\ a_{2(n-i)+1}\ a_{2(n-i)}$$

In both cases $A_{n-i}$ and $A_{n-i}'$ are numbers containing $2(i+1)$ digits.

In both cases:

$$B_{n-i} = \underbrace{1\ 1 \ldots 1}\ \overline{r_n}\ \overline{r_{n-1}} \ldots \overline{r_{n-i+1}}\ 1\ 1$$

This number likewise contains $2(i+1)$ digits.

The apparatus comprises an adder which receives, at its respective inputs A and B, the two binary numbers $A_{n-i}$ or $A_{n-i}'$ on one hand, and $B_{n-i}$ on the other hand, said numbers having been made up in suitable registers or memories, adds them together and feeds the carry-forwards of the addition to a shift register. In the description which follows, the numbers $A_{n-i}$ and $A_{n-i}'$ are treated as identical and designated as the number $A_{n-i}$, which can therefore take two different forms according to the value of $r_{n-i+1}$.

At each calculating cycle $i$ the remainder $\Sigma_{n-i}$ resulting from the preceding cycle is less than or at most equal to twice the root found $r_n\ r_{n-1} \ldots r_{n-i}$, therefore $\Sigma_{n-i}$ includes at the maximum $(i+2)$ significant digits. In the case of the cycle $(i+1)$, it is necessary to take into account the two following digits of the given number the square root of which is to be found. There could therefore be $(i+4)$ significant digits at the input 1 of the adder for the calculating cycle $(i+1)$ and consequently $(i+3)$ digits for the cycle $i$. The maximum capacity of the adder will accordingly be reached with the calculation of $r_o$ for $i=n$. Consequently, the adder should be capable of adding two numbers containing $(n+3)$ digits, i.e. two digits more than the maximum number of significant digits of the root.

The invention will now be described in more detail, by way of example only, with reference to the accompanying drawings, in which.

In the figures, like elements are denoted by like references, letters or numbers.

Figure 1:
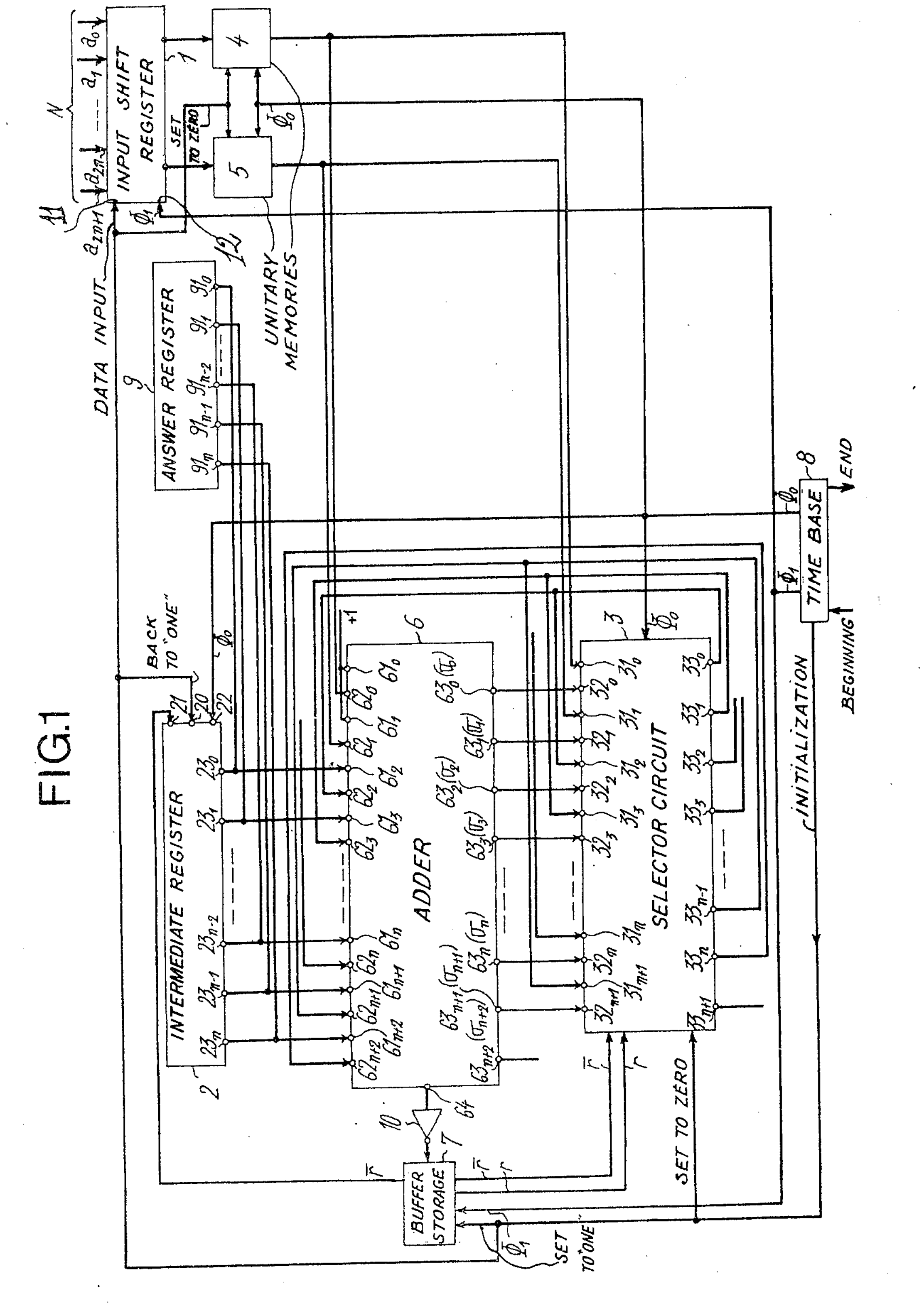
FIG. 1 shows the logical circuit diagram of the apparatus.

The circuit for the extraction of square roots essentially comprises a first input shift register 1, a second (intermediate) shift register 2 for continuously forming the square root, a selector circuit 3, two unitary memories 4 and 5, an adder 6, a buffer storage unit 7, a time base 8 and a result register (answer register) 9.

The bits $a_{2n+1}$ to $a_o$ of the number N the square root of which is required may be fed in parallel to the input of the input register 1 controlled by a data input pulse applied to the terminal 11 of the latter register by the time base 8. Under the control of forward pulses applied to the input 12 of 11 by the time base 8, the shift register 1 advances by two digits at each forward pulse and feeds to two unit memories 4 and 5 the couples of digits $a_{2n+1}$, $a_{2n}$, then $a_{2n-1}$, $a_{2n-2} \ldots$ finally $a_1$, $a_o$.

The shift (intermediate) register 2 is fed at its series input 21 with the complement $\bar{r}$ of the addition carry-forward delivered by the adder 6 and stored in the buffer storage unit 7. More precisely, the signal $r$ appearing at the output 64 of the adder 6 is applied an inverter circuit 10, the output of which is connected to the buffer storage 7. The output of the buffer storage unit is connected to the series input 21 of the intermediate register 2. This register has two functions: it delivers the result at the end of the calculation or more precisely, a number the digits which are the complements of those of the result, to the results register 9, and during the calculation it supplies a part of the number $B_{n-i}$. The outputs of the shift register 2 are numbered $\mathbf{23}_0$ to $\mathbf{23}_n$ and are respectively connected to the inputs $\mathbf{61}_2$ to $\mathbf{61}_{n+2}$ of the adder 6, that is, with a shift of two binary orders. The outputs $\mathbf{23}_0$ to $\mathbf{23}_n$ of the shift register 2 are connected respectively to the inputs $\mathbf{91}_0$ to $91_n$ of the results (answer) register 9.

The logical (selector) circuit 3 comprises 2 ($n$+2) pairs of input terminals $\mathbf{31}_0$ to $\mathbf{31}_{n+1}$ and $\mathbf{32}_0$ to $\mathbf{32}_{n+1}$ and ($n$+2) output terminals $\mathbf{33}_0$ to $\mathbf{33}_{n+1}$. The input terminals $\mathbf{31}_2$ to $\mathbf{31}_{n+1}$ are respectively connected to $n$ output terminals $\mathbf{33}_0$ to $\mathbf{33}_{n-1}$. The ($n$+2) input terminals $\mathbf{32}_0$ to $\mathbf{32}_{n+1}$ are respectively connected to ($n$+2) output terminals $\mathbf{63}_0$ to $\mathbf{63}_{n+1}$ of the adder 6. The terminals $\mathbf{31}_0$ and $\mathbf{31}_1$ are respectively connected to the outputs of the unitary memories 4 and 5.

Figure 3:
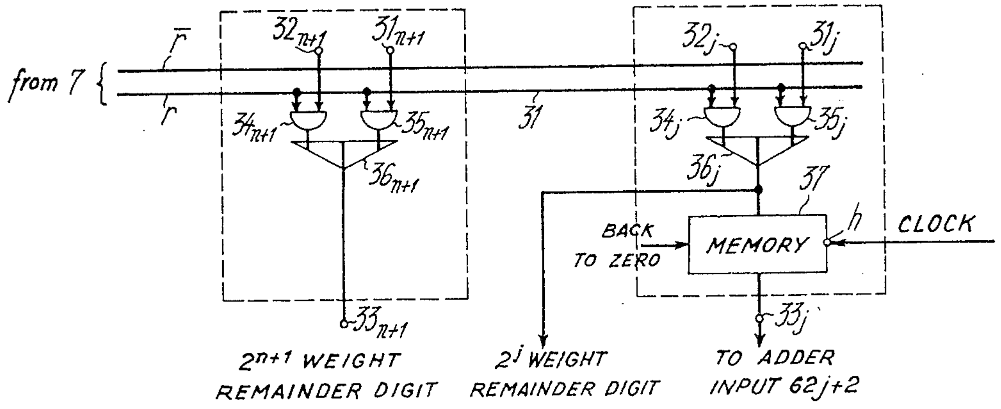
FIG. 3 shows a detail of the circuit element 3 of FIG. 1.

Details of the logical circuit 3 are shown in FIG. 3. It comprises ($n$+2) cells two only of which, those of rank $j$ and of rank ($n$+1) are shown in the drawing. Each cell includes an AND-gate 34 the inputs of which are connected to terminals 32 and a bus bar to which is applied the signal $r$ and an AND-gate 35 the inputs of which are connected to terminals 31 and a bus bar to which is applied the signal $\bar{r}$. The outputs of the AND-gates 34 and 35 are connected to an OR-gate 36 the output of which is itself connected to a unitary memory 37. This unitary memory is controlled by the time base (or "clock") 8. The selector circuit 3 is intended to provide the number $A_{n-i}$.

It will be seen that the result of the addition, i.e. the number $\Sigma_{n-i+1}$, is applied to the inputs 32, while the number $A_{n-i+1}$ (or $A_{n-i+1}'$) is applied to the inputs 31, and that the logical circuit provides the first or the second of these numbers depending on whether $r$ is equal to one or to zero. The two last digits to form $A_{n-i}$ or $A_{n-i}'$ are added in the adder, as will be seen.

The adder 6 is an adder for two binary numbers with ($n$+3) digits. It includes in the first place, ($n$+3) inputs $\mathbf{61}_0$ to $\mathbf{61}_{n+2}$ intended for the input of the number $B_{n-i}$, the first two elements of which are permanently connected to the logical level (+1) and the other ones, $\mathbf{61}_2$ to $\mathbf{61}_{n+2}$, are respectively connected to the outputs $\mathbf{23}_0$ to $\mathbf{23}_n$ of the shift register 2, and in the second place ($n$+3) inputs $\mathbf{62}_0$ to $\mathbf{62}_{n+2}$ intended for the input of the number $A_{n-i}$ and the first two elements of which are permanently connected to the outputs $\mathbf{33}_0$ to $\mathbf{33}_n$ of the logical circuit 3.

Figure 2:
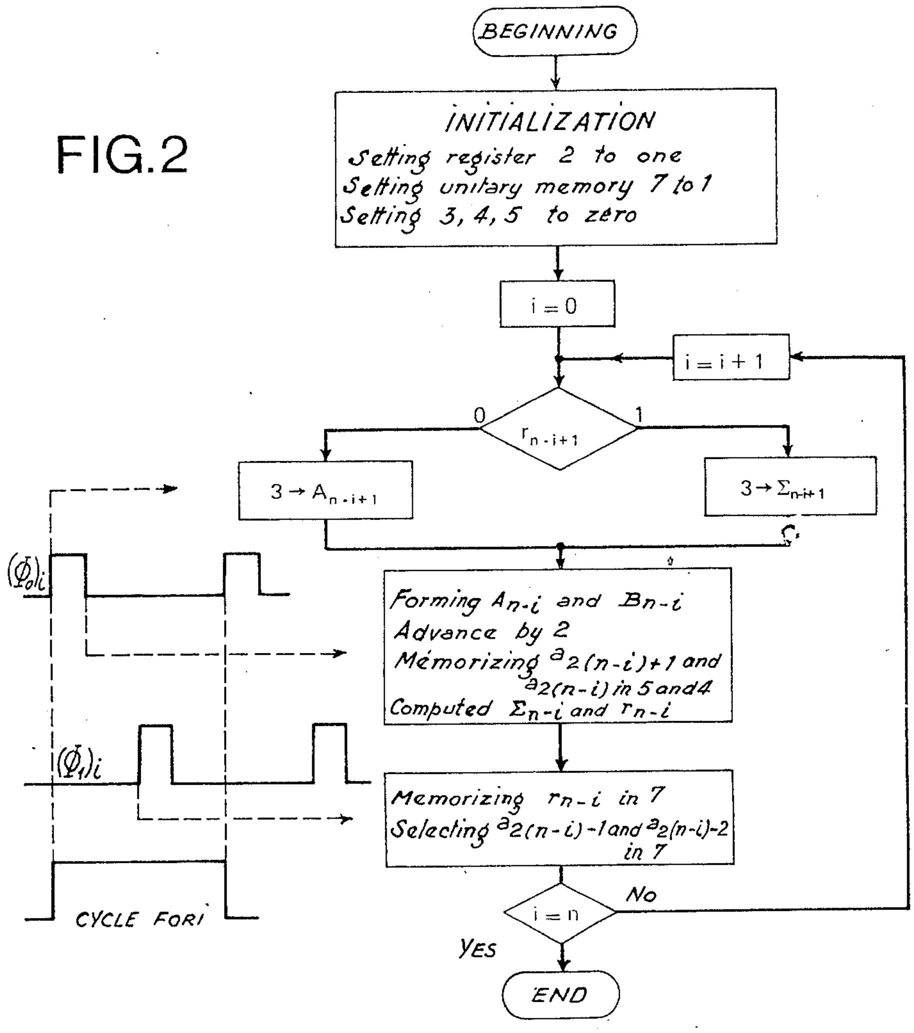
FIG. 2 shows an algorithm indicating the phases of the operations in each cycle.

The operation of the time base 8 is shown in the algorithm of FIG. 2. It includes two phases $(\phi_0)_i$ and $(\phi_1)_i$ per cycle. It provides the different clock signals required for the functioning of the circuits of FIG. 1 and indicated by the letter $h$ in FIG. 3. The phase $\phi_0$ controls the circuits 2,3,4 and 5 and the phase $\phi_1$, the circuits 1 and 7. During the phase $(\phi_0)_i$, the following operations take palce; the building up, apart from their last two digits, of $A_{n-i}$ in 3 and $B_{n-i}$ in 2, forward shift of the register 2 by one row or place or rank, storing of $a_{2(n-i)+1}$ and $a_{2(n-i)}$ in the unitary memories 4 and 5, calculation of $\Sigma_{n-i}$ and of $r_{n-i}$. In phase $(\phi_1)_i$, the following operations take place: storing of $r_{n-i}$ in the memory 3, shift of two rows or places in the input register 2 and selection in this register of $a_{2(n-i)-1}$ and $a_{2(n-i)-2}$.

The wave front of the pulse $(\phi_0)_i$ should cause the appearance at the output of circuit 3 either of the preceding addition result $\Sigma_{n-i+1}$, if $r_{n-i+1}$ is equal to 1, or of the number $A_{n-i+1}$, if $r_{n-i+1}$ is equal to 0. Once the correct input variable has been processed in the circuit 3, the memories 4 and 5 are loaded so as to have at their inputs the binary digits $a_{2(n-i)+1}$ and $a_{2(n-i)}$, so that $A_{n-i}$ appears at the input of the adder 6. At the same time, the intermediate register 2 is shifted by one row or place, which brings $\overline{r_{n-i+1}}$ to the output 0 of the register 2, so that the number $B_{n-i}$ is the second number present at the input of the adder 6.

The circuit 8 also includes an output labelled "initialization" the object of which, during the reception of the signal corresponding to the request for calculation, is to introduce suitable input or output data in the various circuits of the assembly while the initialization signal lasts. This signal performs the following operations:

1. — Setting to 1 the register 2;
2. — Setting to 0 the outputs of the logical circuit 3;
3. — Setting to 1 the buffer storage 7 to 1 and the unitary memories 4 and 5;
4. — Feeding the known quantities (data) $a_o$ to $a_{2n+1}$ to the input register 1.

It may be remarked that, after initialization during the cycle $i=0$, there are really $a_{2n+1}$ and $a_{2n}$ digits at the inputs $\mathbf{62}_0$ and $\mathbf{62}_1$ of the adder 6, all the other inputs $\mathbf{62}_2$ to $\mathbf{62}_{n+2}$ being set to 0, and all the inputs $\mathbf{61}_0$ to $\mathbf{61}_{n+2}$ being set to 1.

The termination of the initialization pulse gives rise to the starting of ($n$+1) computing cycles.

When cycle $i = n+1$ arrives, the time base ceases to emit pulses $\phi_0$ and $\phi_1$. A final pulse is a signal that the time base has fulfilled its part.

A partial result of the square root calculation in the shape of its complement then appears at the output terminals $\mathbf{23}_0$ to $\mathbf{23}_n$.

The remainder of the square root value is available at the output of circuit 3 if this circuit is constituted as indicated in FIG. 3. The binary digit with a weighting of $2^j$ of the remainder appears at the output of the OR-circuit 36 (FIG. 3) at the conclusion of the operation. The first ($n$+1) digits of the remainder therefore each appear at the output of the logical combined assembly which drives the memory element 37 of each cell of the circuit 3. It is obviously necessary to provide an identical combined assembly so as to form the binary digit with the greatest weight in the remainder.

By way of example, the extraction of the square root of the number $$N = 1\ 0\ 0\ 1\ 0\ 0 = 36$$

will be given in the following.

In this case, we have:

$$n = 2;\ a_5 = 1;\ a_4 = 0;\ a_3 = 0;\ a_2 = 1;\ a_1 = 0;\ a_o = 0$$

Cycle $i = 0$

Outputs $\mathbf{23}_2$ to $\mathbf{23}_0$ of circuit 2 (all set to 1):

1 1 1

Inputs $\mathbf{61}_4$ to $\mathbf{61}_0$ of circuit 6 (all set to 1):

$$B_2 = [1\ 1\ 1\ ]\ 1\ 1$$

Inputs $\mathbf{62}_4$ to $\mathbf{62}_0$ of circuit 6 (all set to 0 except the last two which are on $a_5$ and $a_4$):

$$A_2 = [0\ 0\ 0\ ]\ a_5\ a_4 = 0\ 0\ 0\ 1\ 0$$

Total in circuit 6:

$$\begin{array}{rl} A_2 = & [0\ 0\ 0]\ 1\ 0 \\ B_2 = & [1\ 1\ 1]\ 1\ 1 \\ r_1(\sigma_1)_2\,(\sigma_0)_2 = & 1\ \ [0\ 0\ 0]\ 0\ 1 \end{array}$$

wherefrom $r_1 = 1$; $(\sigma_1)_2 = 0$; $(\sigma_o)_2 = 1$

Cycle $i = 1$

Outputs 23$_2$ to 23$_0$ of circuit 2 (all set to 1 except the last on $\overline{r_2}$)

$$1\ 1\ \overline{r_2} = 1\ 1\ 0$$

Inputs 61$_4$ to 61$_0$ of circuit 6:

$$B_1 = 1\ 1\ 0\ 1\ 1$$

Inputs 31$_3$ to 31$_0$ of circuit 3:

$$0\ 0\ a_5\ a_4 = 0\ 0\ 1\ 0 \qquad (1)$$

Inputs 32$_3$ to 32$_0$ of circuit 3:

$$0\ 0\ (\sigma_1)_2\ (\sigma_0)_0 = 0\ 0\ 0\ 1 \qquad (2)$$

Since $r_2 = 1$, the signal (2) is selected as the output signal of circuit 3.

Inputs 62$_4$ to 62$_0$ of circuit 6:

$$A_1 = 0\ 0\ 1\ a_3\ a_2 = 0\ 0\ 1\ 0\ 1$$

Total in circuit 6:

$$\begin{array}{rl} A_1 = & [0]\ 0\ 1\ 0\ 1 \\ B_1 = & [1]\ 1\ 0\ 1\ 1 \\ r_1\ (\sigma_3)_1\ (\sigma_2)_1\ (\sigma_1)_1\ (\sigma_0)_1 = & 1\ [0]\ 0\ 0\ 0\ 0 \end{array}$$

whence $r_1 = 1$; $(\sigma_3)_1 = (\sigma_2)_1 = (\sigma_1)_1 = (\sigma_0)_1 = 0$ Cycle $i = 2$ Outputs 23$_2$ to 23$_0$ of circuit 2:

$$1\ \overline{r_2}\ \overline{r_3} = 1\ 0\ 0$$

Inputs 61$_4$ to 61$_0$ of circuit 6:

$$B_0 = 1\ 0\ 0\ 1\ 1$$

Inputs 31$_3$ to 31$_0$ of circuit 3:

$$(\sigma_1)_2\ (\sigma_0)_2\ a_3\ a_2 = 0\ 1\ 0\ 1 \qquad (3)$$

Inputs 32$_3$ to 32$_0$ of circuit 3:

$$(\sigma_3)_1\ (\sigma_2)_1\ (\sigma_1)_1\ (\sigma_0)_1 = 0\ 0\ 0\ 0 \qquad (4)$$

Since $r_1 = 1$, the signal (4) is selected as the output signal of circuit 3.

Inputs 64$_4$ to 64$_0$ of circuit 6:

$$A_0 = 0\ 0\ 0\ a_1\ a_0 = 0\ 0\ 0\ 0\ 0$$

Total in circuit 6:

$$\begin{array}{rl} A_0 = & 0\ 0\ 0\ 0\ 0 \\ B_0 = & \underline{1\ 0\ 0\ 1\ 1} \\ r_0(\sigma_4)_0(\sigma_3)_0(\sigma_2)_0(\sigma_1)_0(\sigma_0)_0 = & 0\ 1\ 0\ 0\ 1\ 1 \end{array}$$

whence $r_0 = 0$

The square root is therefore:

$$r_2\ r_1\ r_0 = 110 = 6$$

Since $r_0 = 0$, the remainder is given by the signal appearing at the inputs 31$_4$ to 31$_0$ of circuit 3, that is to say 0 0 0 0 0.

Numerous variants of embodiment are possible and come within the scope of the invention. More particularly, the input shift register could be replaced by two shift registers, one for the odd digits, the other for the even digits of the number from which the square root is to be extracted, a shift of one step in each register being carried out at each cycle.

The input register could also be replaced by two addressable registers receiving respectively the even and odd binary digits. The digits used in each computing cycle could then be obtained at the output by locating pulses delivered by the time base 8.

What I claim is:

1. Apparatus for the extraction of the square root of a given binary number having 2(n+1) digits, comprising:

means including an input shift register controlled by a time base for recording said given binary number and for successively extracting ($n$+1) two-digit groups from said given binary number;

two unitary memories for storing said extracted two-digit groups;

an intermediate shift register recording in succession the found digits of the square root;

means controlled by said intermediate register for building up a first further binary number having ($n$+3) digits which, starting from the zero weight binary digit, are two "ones", then the complements to the already found digits of the square root, and finally ones;

an adder adding said first further binary number to a second further binary number;

a selector circuit receiving a first auxiliary binary number from said adder and a second auxiliary binary number;

said second further binary number being formed by the output number from said selector circuit, the digits of which have been shifted two binary places to the upper weight end and the two digit places on the zero weight end of which are a group of two digits of said given binary number which is received from said unitary memories;

said selector circuit including means for selecting said first auxiliary number from said adder when the last preceeding found digit of the square root is a one and also including means for selecting said second auxiliary number when the last preceeding found digit of the square root is a "zero"; and, means for feeding the successive carry forwards of the addition from the adder to said intermediate register whereby the digits of the wanted square root are obtained as these successive carry forwards in addition to said first and second further binary numbers.

2. Apparatus for extracting the square root of a given binary number as claimed in claim 1, further comprising a clock circuit furnishing two phases per cycle, the first phase controlling said means for building up said first binary number, said selector circuit and said two unitary memories linked with the input register, and the second phase controlling said memory linked with said adder.

* * * * *